US008886888B2

(12) United States Patent
Yasuhara

(10) Patent No.: US 8,886,888 B2
(45) Date of Patent: Nov. 11, 2014

(54) STORAGE SYSTEM

(71) Applicant: Hitachi, Ltd., Tokyo (JP)

(72) Inventor: Kazuhiro Yasuhara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/004,715

(22) PCT Filed: Jan. 29, 2013

(86) PCT No.: PCT/JP2013/051834

§ 371 (c)(1),
(2), (4) Date: Oct. 18, 2013

(87) PCT Pub. No.: WO2014/118874

PCT Pub. Date: Aug. 7, 2014

(65) Prior Publication Data

US 2014/0215151 A1 Jul. 31, 2014

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0689* (2013.01); *G06F 3/0619* (2013.01); *G06F 3/0665* (2013.01)
USPC ............ 711/144

(58) Field of Classification Search
USPC ............ 711/114
See application file for complete search history.

(56) References Cited

U.S. PATENT DOCUMENTS

| | | | | |
|---|---|---|---|---|
| 7,624,306 | B2 * | 11/2009 | Miyamoto | 714/37 |
| 2007/0245110 | A1 | 10/2007 | Shibayama et al. | |
| 2008/0104248 | A1 | 5/2008 | Yahiro et al. | |
| 2008/0162272 | A1 * | 7/2008 | Huang et al. | 705/11 |
| 2008/0244331 | A1 | 10/2008 | Grimes et al. | |
| 2011/0106978 | A1 | 5/2011 | Shishido et al. | |
| 2012/0317358 | A1 | 12/2012 | Ando et al. | |

FOREIGN PATENT DOCUMENTS

| | | | |
|---|---|---|---|
| JP | 2007-286709 | A | 11/2007 |
| JP | 2008-108120 | | 5/2008 |
| JP | 2010-524053 | A | 7/2010 |
| JP | 2012-247937 | A | 12/2012 |
| WO | WO 2012/169027 | A1 | 6/2011 |

OTHER PUBLICATIONS

PCT International Search Report and Written Opinion on application PCT/JP2013/051834 dated May 14, 2013; 10 pages.

* cited by examiner

*Primary Examiner* — Matthew Bradley
*Assistant Examiner* — Rocio Del Mar Perez-Velez
(74) *Attorney, Agent, or Firm* — Foley & Lardner LLP

(57) ABSTRACT

In order to enhance the accuracy of problem analysis in a disk subsystem, the present invention suspends system trace and writing of system trace information to a storage area at the timing of occurrence of a problem. The suspension of system trace and the writing of system trace information to the storage area is executed not only in the disk subsystem where the problem failure has occurred, but also in all the other connected disk subsystems. Then, a maintenance terminal is used to collect dump information including the system trace information.

13 Claims, 16 Drawing Sheets

STORAGE SYSTEM

TECHNICAL FIELD

The present invention relates to a storage system.

BACKGROUND ART

In prior art disk subsystems, the collection of failure information (dump information) has been performed independently in the respective disk subsystems. In an environment where only a single disk subsystem is used or in a remote copy environment where disk subsystems are connected in a one-to-one relationship, no serious problem occurs in performing failure analysis even if the dump information is collected independently in each disk subsystem.

However, in recent remote copy environments, systems are formed astride multiple disk subsystems. For example, in an environment where remote copy is performed in a system where four disk subsystems are included in a copy source primary side and four disk subsystems are included in a copy destination secondary side (universal replicator four-to-four), data replication is executed while maintaining order among eight disk subsystems.

Therefore, in order to perform speedy failure recovery action when a failure occurs, it is preferable that the failure information collected during the same period of time, such as a dump information which is a progression information of a process of a system control program (micro program), is obtained. Further, if a process delay problem occurs not only between disk subsystems but between a host computer and a disk subsystem, since multiple disk subsystems cooperate to execute processes, it is preferable to collect dump information from all subsystems.

Therefore, as shown in patent literature 1, a technique is proposed to transmit dump information as failure information to the host computer when failure occurs in a disk subsystem.

CITATION LIST

Patent Literature

[PTL1] Published Japanese Translations of PCT International Publication for Patent Applications No. 2010-524053 (United States Patent Application Publication No. 2008/0244331)

SUMMARY OF INVENTION

Technical Problem

When a problem occurs in the disk subsystem, the information regarding the disk subsystem is collected by a maintenance terminal to analyze the cause of the problem. The collected information is referred to as a dump information or simply a dump, which includes memory information within the disk subsystem, an error code left by the micro program, a system trace information recording a detailed operation history of the micro program, a user operation log information, and so on.

The most important information for analyzing the action of the micro program is the system trace information. Information is stored in order corresponding to the order of processes of the micro program in a system trace area. However, since the area for storing the information is limited, old information is overwritten by new information.

In other words, if the collection of dump information is delayed, the information at the time a problem has occurred and required for analyzing the problem may be overwritten by other processes performed in the disk subsystem thereafter. Further, in a remote copy environment, from the viewpoint of disaster recovery, the respective disk subsystems are arranged separately at distant locations, so that time is required if a maintenance operator must go to respective locations and perform maintenance. Therefore, it may be difficult to collect the dump information of all disk subsystems at the same period of time.

The object of the present invention is to simultaneously collect from all the disk subsystems the dump information immediately after the occurrence of a problem such as a failure between the host computer and the disk subsystem regardless of the remote copy environment, and to realize speedy problem analysis and failure response.

Solution to Problem

In order to solve the above problems, the present invention suspends system trace and writing of system trace information to a storage area at a timing of occurrence of a problem. The suspension of system trace and the writing of system trace information to a storage area is performed not only in the disk subsystem where failure has occurred but also in all the other connected disk subsystems. Thereafter, dump information including the system trace information is collected and saved in a storage area other than the storage are for system trace information.

Advantageous Effects of Invention

According to the present invention, it is possible to suspend the system trace and the writing of system trace information to the storage area in all the disk subsystems at a timing of occurrence of a problem, dump information required for problem analysis can be collected without fail, and the problem can be analyzed easily in a short time. Problems, configurations and effects other than those described above will become apparent in the following description of preferred embodiments.

DESCRIPTION OF EMBODIMENTS

Figure 1:
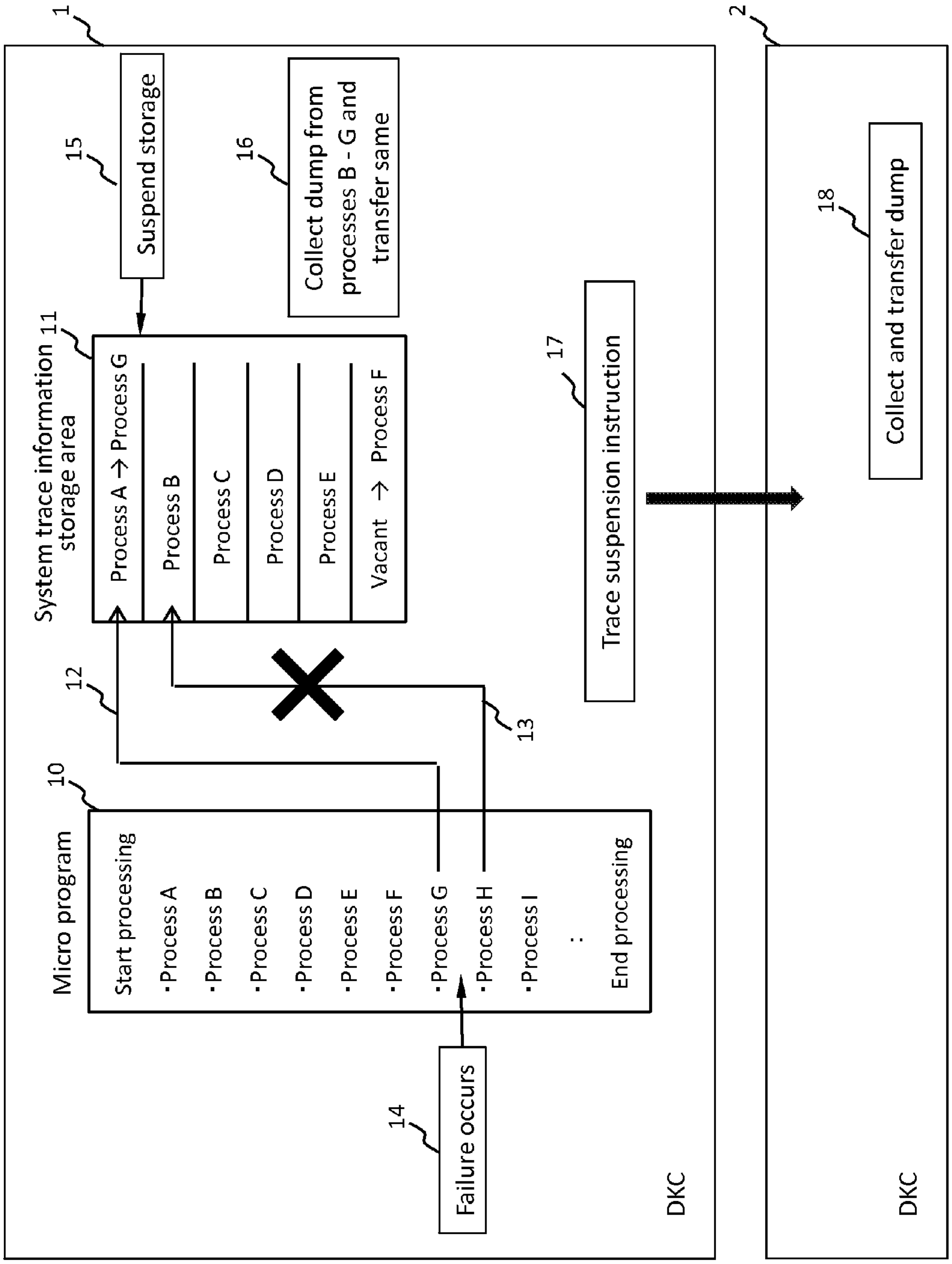
FIG. 1 is a view showing a concept of the present invention.

Now, the preferred embodiments of the present invention will be described with reference to the drawings. In the following description, various information are referred to as "information" and the like, but the various information can be expressed by data structures such as tables.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

<Concept of Invention>

The concept of the present invention will be described with reference to FIG. 1.

FIG. 1 is a view showing a concept of the present invention. A disk subsystem includes a DKC (Disk Controller) which is a controller unit for controlling the overall system. The DKC 1 includes a micro program 10 for executing control of the overall system, and a system trace information storage area 11 for storing the result of execution of the micro program 10 (system trace information).

The system trace information storage area 11 becomes full when the execution result of the first process A to process F has been stored. The system trace information of subsequent process G is saved by overwriting the information of process A at the head of the area which has become the oldest information. System trace refers to tracing the order in which the program has been processed.

After occurrence of failure or other problem, if it is not possible to perform collection of dump information speedily, important information during occurrence of failure may be overwritten by subsequent processes, so that it becomes difficult to solve the cause of failure. In other words, after the occurrence of failure 14, the system trace information 13 of process H may overwrite process B. Such overwrite is continued until a maintenance operator orders to stop storage 15 to the system trace information storage area 11, and the information required to analyze the failure may be lost. Dump information refers to the information such as the contents of processes performed via a program stored in a memory such as the system trace information storage area 11, history of warnings, or the contents of files and memories, which is also called a log.

Therefore, according to the present invention, a microprocessor within the DKC 1 and the like stops storing data (suspend storage 15) to the system trace information storage area 11 at the time failure has occurred (occurrence of failure 14). In other words, as shown by reference number 13, the execution results of process H and thereafter are not stored in the system trace information storage area 11. Then, as shown in reference number 16, the dump information of process G is collected from process B, which is transferred to a maintenance terminal called SVP (Service Processor) described later, and saved therein. Further, a system trace suspend instruction 17 is transmitted to the other DKC connected to DKC 1, which in FIG. 1 is the DKC 2, and executes storage suspension to the system trace information storage area 11 in DKC2, the collection of dump information, and the transferring of the collected dump information to the SVP. In other words, dump information is collected simultaneously in each DKC at the time of occurrence of failure, and the information is saved in the SVP.

As described, even in an environment where a plurality of DKCs are connected and used, such as in a remote copy environment (environment where copying of data is executed remotely from a primary DKC to a secondary DKC disposed at a location different from the primary DKC), it becomes possible to solve the problem of not being able to collect timely information due to the drawback of different locations of disk subsystems, and to realize speedy and accurate collection of information necessary for determining the cause of failure, so that it no longer becomes necessary to attempt re-collecting of dump information by awaiting reoccurrence of the problematic phenomenon.

<Internal Configuration of Disk Subsystem>

Figure 2:
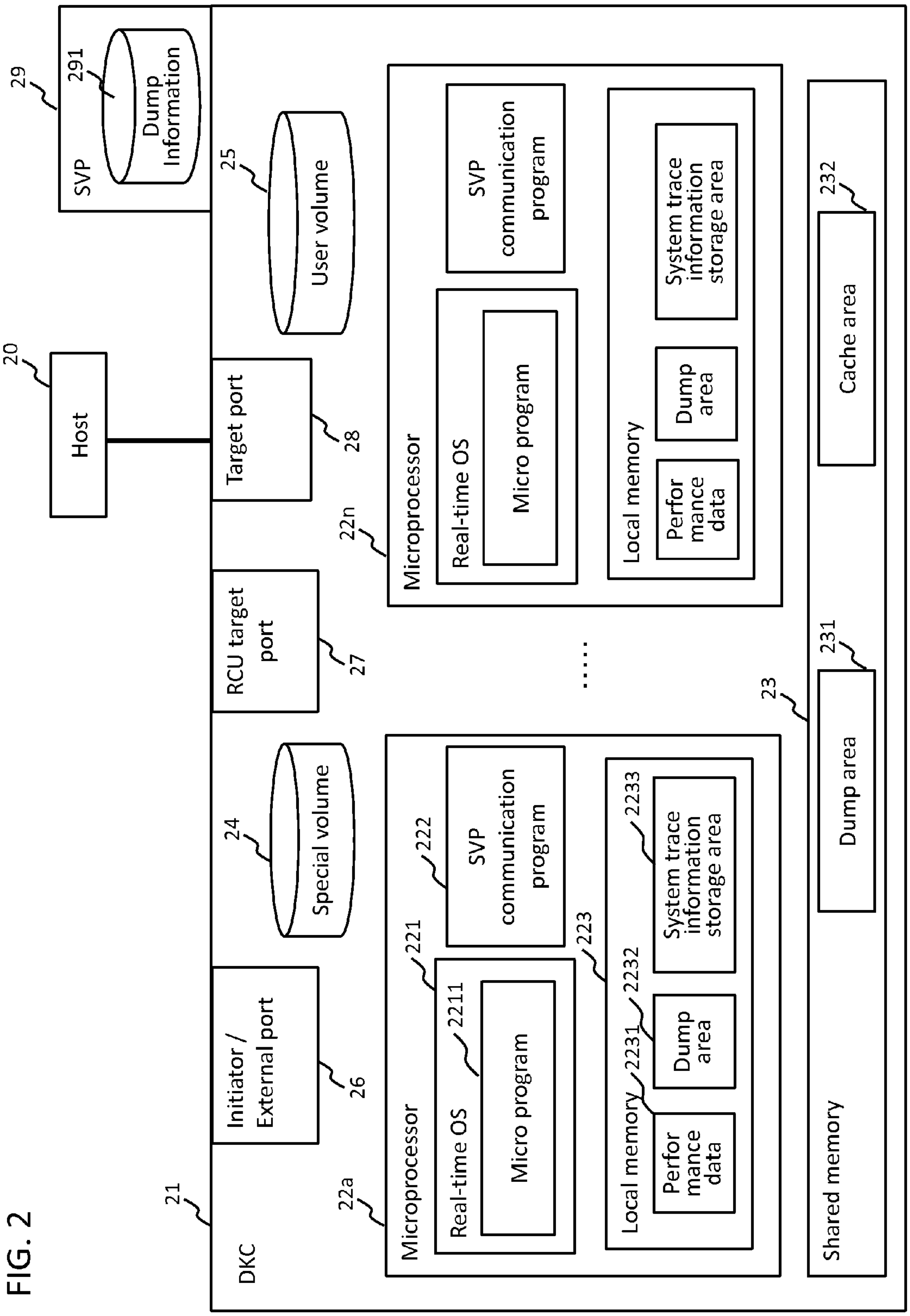
FIG. 2 is a block diagram showing a disk controller unit in a disk subsystem according to the present invention.

FIG. 2 is a block diagram showing a disk controller unit in the disk subsystem according to the present invention.

The disk subsystem comprises a DKC 21 and an SVP 29, which are connected to a host computer (hereinafter referred to as host) 20 via a target port 28, and the data from the host 20 are stored in a user volume 25. An initiator port/external port 26 and an RCU (Remote Control Unit) target port 27 are ports connected to other DKCs via fiber channels. A remote copy environment is constructed by forming a storage system by connecting a plurality of disk subsystems.

In the DKC 21, there are a plurality of microprocessor units (hereinafter referred to as MP units) 22 mounting a plurality of microprocessors (not shown, hereinafter referred to as MPs) for various programs such as a micro program 2211 which is a real-time OS stored in a nonvolatile memory 221 such as a flash memory or a SVP communication program 222. A local memory (hereinafter referred to as LM) 223 exists in each MP unit 22, and a performance data 2231 used for controlling system trace suspension mentioned later is stored in the LM 223.

Further, the system trace information in the system trace to be suspended is stored in the system trace information storage area 2233 which is a dedicated area in the LM 223. In addition, the LM 223 has a dump area 2232 which is a memory area used by the micro program 2211 to control the program. The dump area 2232 stores the system trace information of a single MP unit 22, and at the time of collection of dump information, the system trace information in this area is also collected.

Further, a shared memory (hereinafter referred to as SM) 23 is a memory for sharing control information and data of the system in the plurality of MPs or MP units 22. A dump area 231 for storing the system trace information regarding the whole DKC 21 exists in the SM 23. Further, a cache area 232 for temporarily storing data from the host 20 or the data to be sent to the host 20 exists in the SM 23. When dump is executed by the micro program 2211, the MP uses an SVP communication program 222 to transfer the system trace information stored in the system trace information storage area 2233, the dump area 2232 of the LM 223 and the dump area 231 of the SM 23 as dump information to the SVP 29.

Although not shown, the SVP 29 includes a CPU for controlling the whole system, an input device for entering information (such as a keyboard, a mouse or other pointing device), an output device for outputting information (such as a display or a printer), a memory device which is a memory media such as a memory or a HDD for storing information, and a communication port for transmitting information to and receiving information from other systems (such as a USB (Universal Serial Bus) port or a LAN (Local Area Network) port). A performance threshold, a range of overtime of the performance threshold and the like mentioned later are set via the input device, and performance data of the hardware resources or the acquired dump information are displayed on the output device.

The SVP 29 having received the system trace information from the DKC 21 stores the system trace information as dump information 291 therein. Further, the DKC 21 has a special volume capable of receiving orders from the micro program 2211, which is called a command device. The special volume executes reception of system trace suspension commands from other DKCs or to transit system trace suspension instructions to other DKCs. The details will be described later.

<Application Environment of Dump Information Collect>

As a method for transmitting trace suspension instructions to connected disk subsystems other than the disk subsystem experiencing failure, in a remote copy environment or an external storage connection environment, disk subsystems are mutually connected via fiber channels to communicate information. Therefore, according to the present invention, the suspension of system trace is orders to the DKC connected via the fiber channel connection path (remote copy connection path/external storage connection path). The application environment of collection of dump information according to the present invention will be described with reference to FIGS. 3 through 8.

Figure 3:
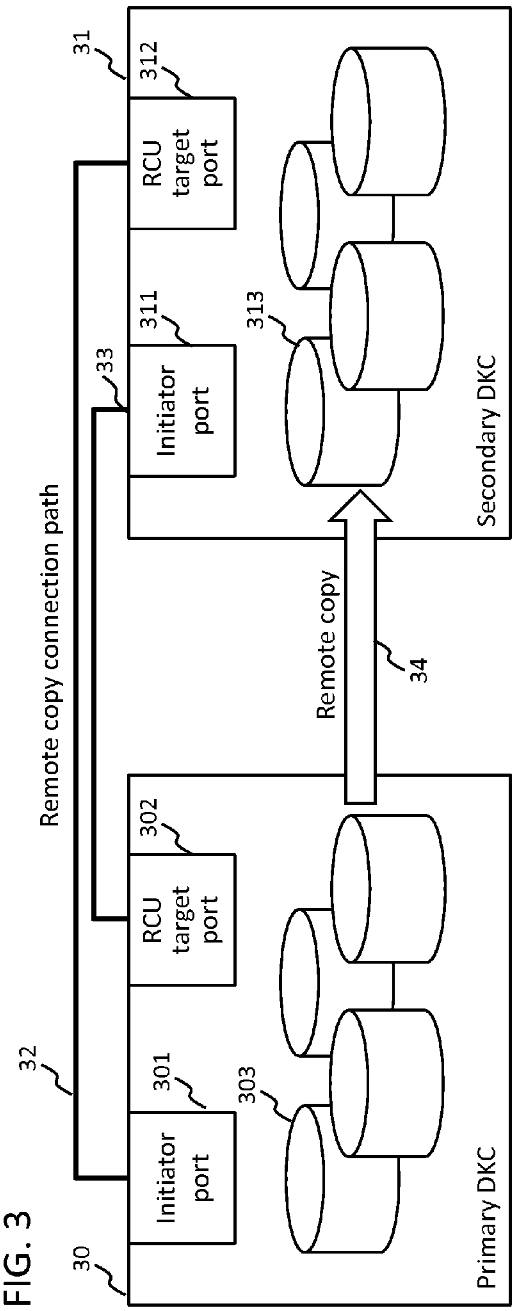
FIG. 3 is a view showing a connection configuration of a disk subsystem in a one-to-one remote copy environment.
Figure 4:
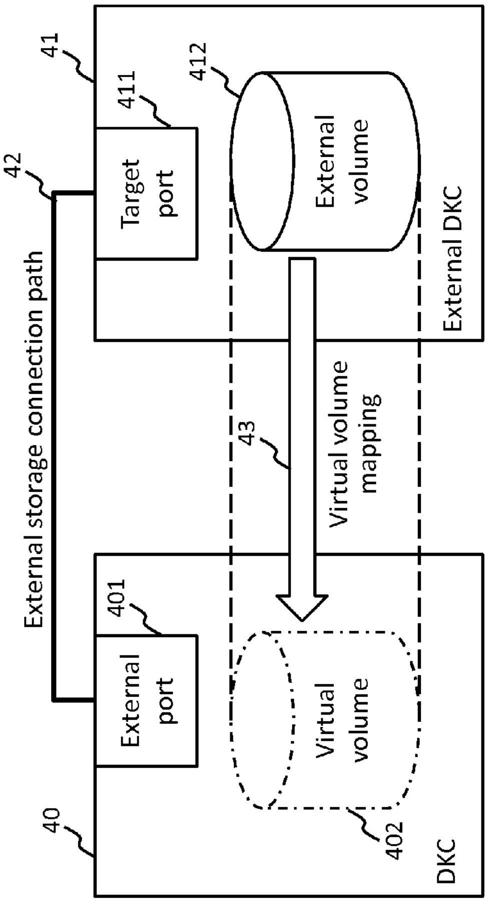
FIG. 4 is a view showing a connection configuration of a disk subsystem in an environment where external storages are used.
Figure 5:
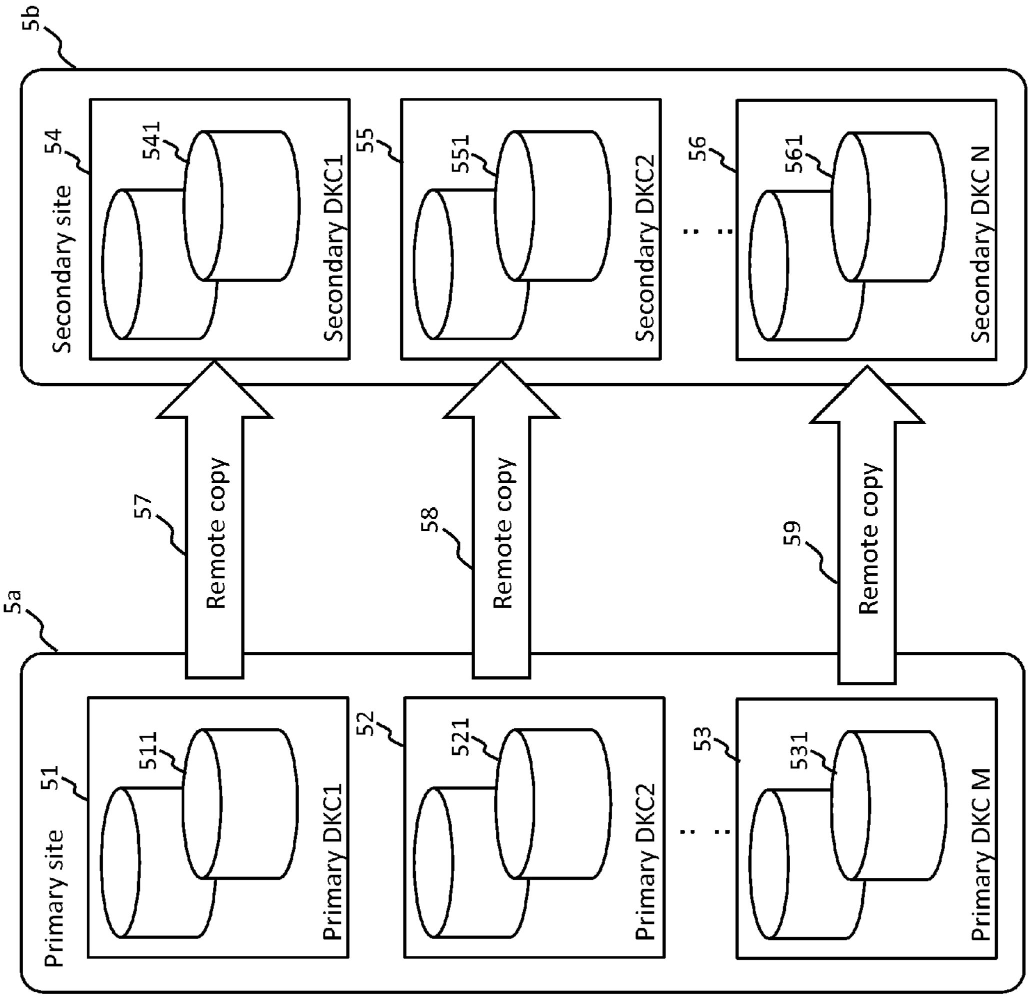
FIG. 5 is a view showing a connection configuration of a disk subsystem in a M-to-N remote copy environment.
Figure 6:
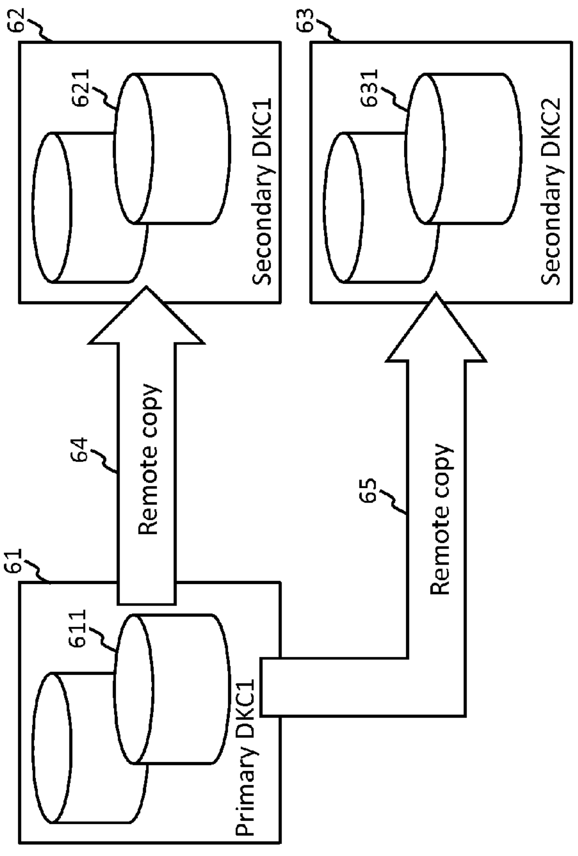
FIG. 6 is a view showing a connection configuration of a disk subsystem in a three data center multi-target remote copy environment.
Figure 7:
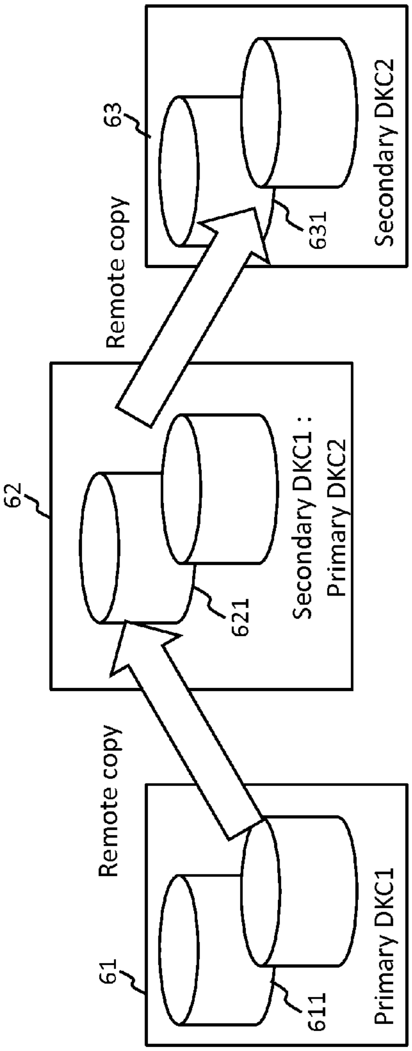
FIG. 7 is a view showing a connection configuration of a disk subsystem in a three data center cascade remote copy environment.
Figure 8:
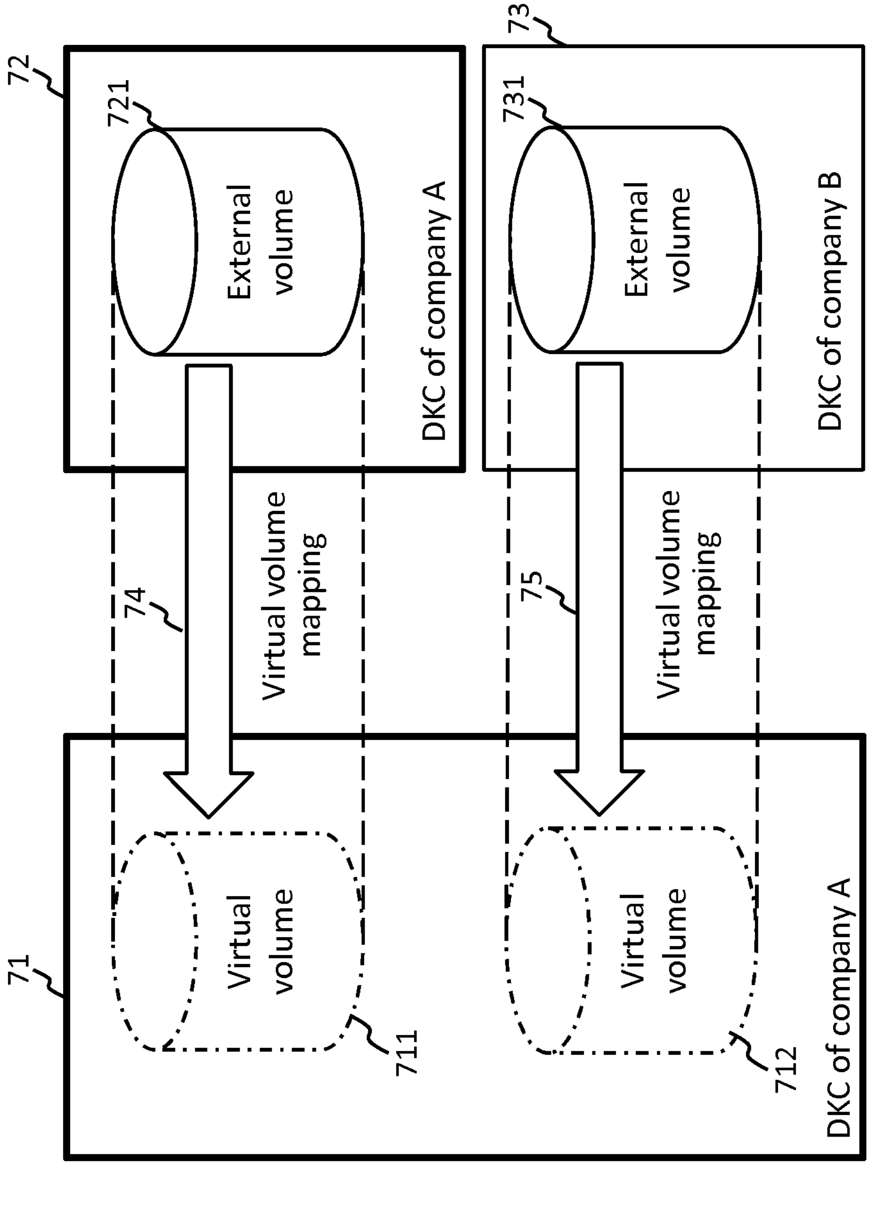
FIG. 8 is a view showing a connection configuration of a disk subsystem in an environment where multiple different external storages are used.

FIG. 3 is a view showing a connection configuration of a disk subsystem in a one-to-one remote copy environment. FIG. 4 is a view showing a connection configuration of a disk subsystem in an external storage use environment. FIG. 5 is a view showing a connection configuration of a disk subsystem in a M-to-N remote copy environment. FIG. 6 is a view showing a connection configuration of a disk subsystem in a three data center (hereinafter referred to as 3DC) multi-target remote copy environment. FIG. 7 is a view showing a connection configuration of a disk subsystem in a 3DC cascade remote copy environment. FIG. 8 is a view showing a connection configuration of a disk subsystem in an environment using multiple different external storages. In the description, the disk subsystem is described as DKC.

The remote copy environment shown in FIG. 3 is an environment for executing a remote copy 34 between a volume 303 of the primary DKC 30 and a volume 313 of the secondary DKC 31. The primary DKC 30 and the secondary DKC 31 are connected via a remote copy connection path 33. That is, an initiator port 301 and an RCU target port 312 are connected via a remote copy connection path 32. Similarly, an initiator port 311 and an RCU target port 302 are connected via a remote copy connection path 33. According to the present invention, transmission and reception of the instruction to suspend system trace is performed via the remote copy connection path 32/33.

In the external storage use environment shown in FIG. 4, a DKC 40 and an external DKC 41 are connected through an external port 401 and a target port 411 via an external storage connection path 42, so that an external volume 412 can be subjected to virtual volume mapping 43 as a virtual volume 402. Similar to FIG. 3, transmission and reception of the instruction to suspend system trace is performed via the external storage connection path 42.

According to the remote copy environment of multiple chassis shown in FIG. 5, a primary DKC1 51 of a primary site 5*a* and a secondary DKC1 54 of a secondary site 5*b* are connected to realize remote copy between a primary volume 511 and a secondary volume 541. Further, similarly, a primary DKC2 52 and a secondary DKC2 55 are connected to realize remote copy between a primary volume 521 and a secondary volume 551. Such connection is performed to M-number of primary DKCs and N-number of secondary DKCs, so as to realize a remote copy environment astride multiple chassis (M+N DKCs) (which is called an M×N universal replicator).

In a remote copy environment astride multiple chassis, the transmission and reception of the instruction to suspend system trace is performed via the remote copy connection path described in FIG. 3. There is also a configuration where P-number of secondary DKCs are connected after the N-number of secondary DKCs, so as to analyze the cause of the problem by collecting dump information from a large number of DKCs, (M+N+P).

In the 3DC multi-target remote copy environment of FIG. 6, a primary DKC1 61, a secondary DKC1 62 and a secondary DKC2 63 are connected to perform remote copy among a primary volume 611, a secondary volume 621 and a secondary volume 631. In a 3DC cascade remote copy environment shown in FIG. 7, the primary DKC1 61 and the secondary DKC1 62 are connected, and further, the secondary DKC1 62 is connected as primary DKC1 to the secondary DKC2 63.

Thereafter, the remote copy between the primary volume 611 and the secondary volume 621 and the remote copy between the secondary volume 621 as primary volume and the secondary volume 631 are performed. Even in such 3DC remote copy environment, the transmission and reception of the instruction to suspend system trace is performed via the remote copy connection path described in FIG. 3.

In the connection environment of the external storage shown in FIG. 8, an external storage (DKC) 72 manufactured by company A (own product) and an external storage (DKC) 73 manufactured by company B (another company product) are connected to a disk subsystem (DKC) manufactured by company A. According to such external storage connection environment, as shown by reference number 74, an external volume 721 is mapped to a virtual volume 711 via virtual volume mapping, and as shown by reference number 75, an external volume 731 is mapped to a virtual volume 712 via virtual volume mapping. Regarding the transmission and reception of the instruction to suspend system trace and the collection and transfer of dump information according to the present invention targets the DKC 71 and DKC 72 which are own products, and the DKC 73 manufactured by another company is not set as the target.

Further, the present invention can be applied not only to the aforementioned multiple DKC environment but also to an environment having only a single DKC. It is also possible to perform transmission and reception of the instruction to suspend system trace and collection of dump information via a general public network such as the Internet capable of connecting to the SVP, instead of using a dedicated line such as a fiber channel.

<Embodiment 1>

<Occasion 1 for Collecting Dump Information>

Figure 9:
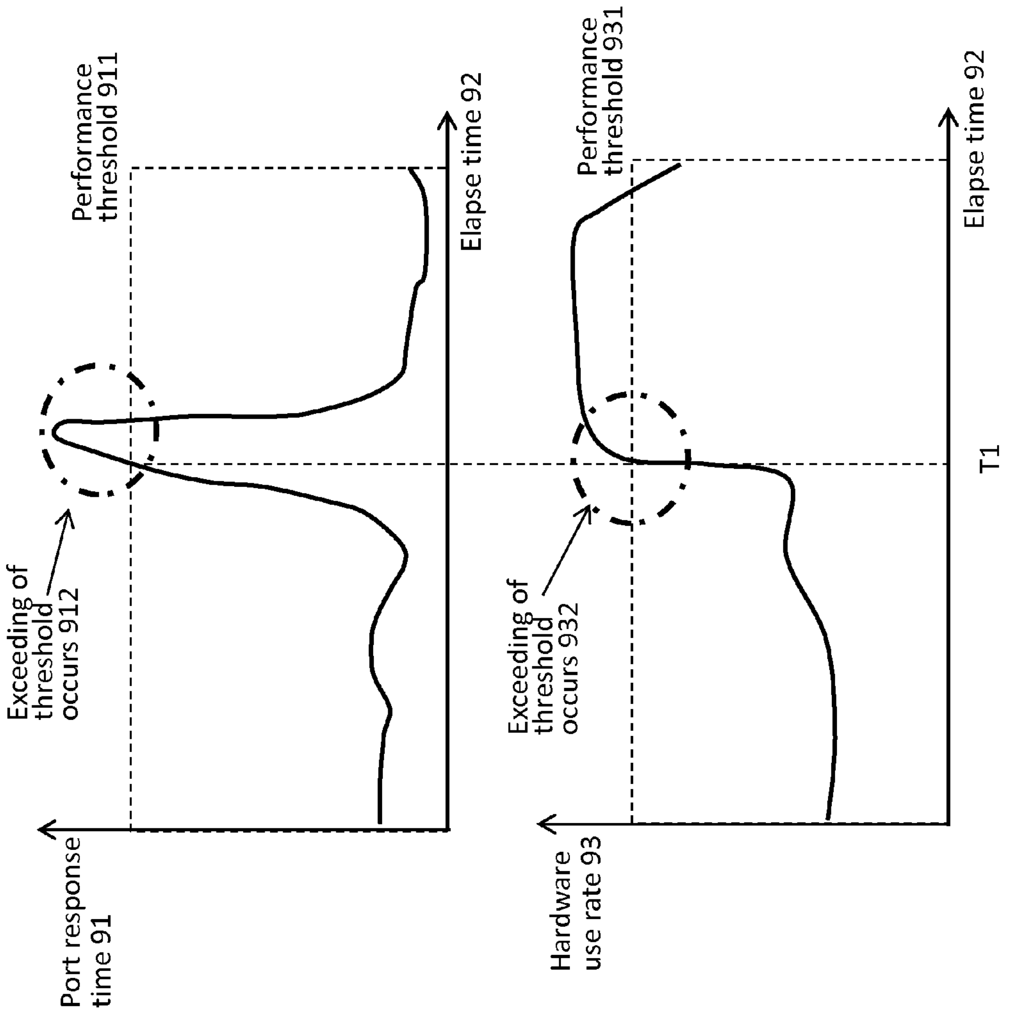
FIG. 9 is a view showing the detection of occurrence of a problem based on system response and status of load of hardware resources in embodiment 1.
Figure 10:
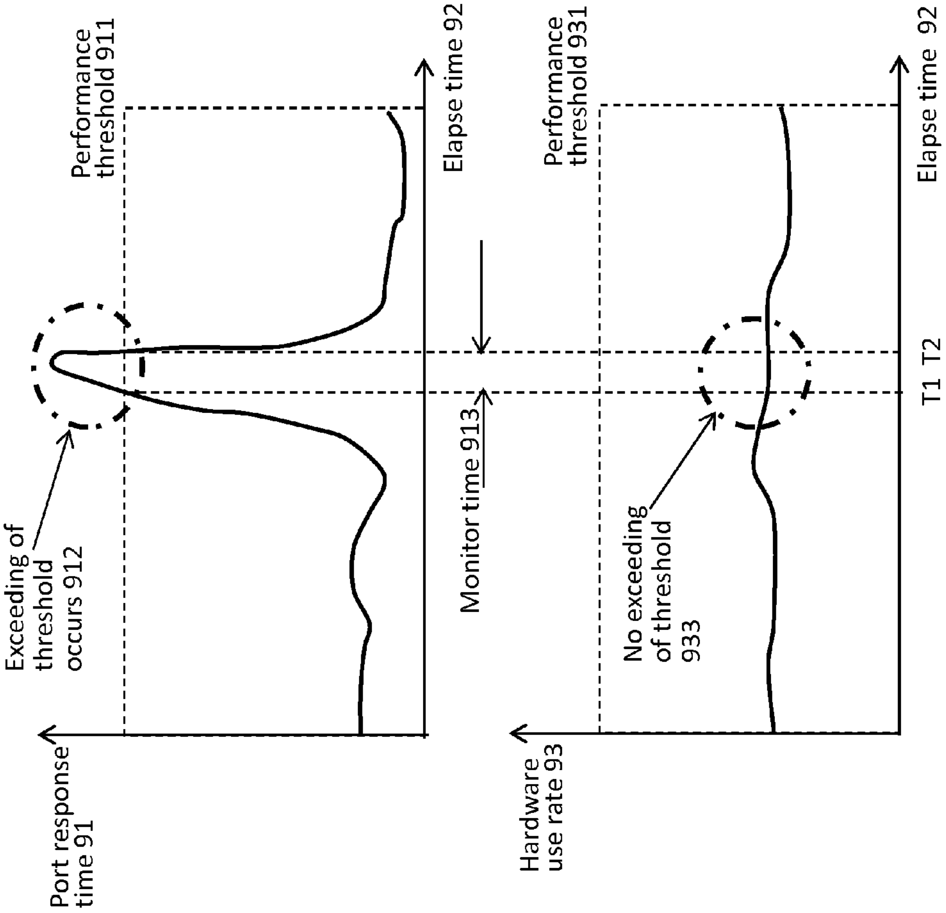
FIG. 10 is a view showing the detection of occurrence of a problem based on system response and status of load of hardware resources in embodiment 1.

FIGS. 9 and 10 are drawings describing the detection of an occurrence of a problem based on a system response and a status of load of the hardware resources according to embodiment 1.

In failure analysis, the problem of performance degradation between the host 20 and the disk subsystem (DKC) 21 is one of the most difficult problems. In order to analyze the cause and to consider the solution of the problem, the collection of dump information immediately after the occurrence of the problem becomes extremely important. Therefore, according to the present invention, system trace in the DKC itself and the DKCs connected thereto are suspended, and the system trace information of each DKC is collected by each SVP in charge of the DKC as dump information (failure information), and the dump information is saved in the volume within the SVP.

Further, the collection of dump information is not only performed once, but the collection of dump information is performed every time a condition is fulfilled as the occasion to collect dump information, and the dump information across multiple generations are saved in the SVP. By analyzing the dump information across multiple generations, it becomes possible to improve the accuracy of determining the cause of failure and to shorten the analysis time.

Next, the occasion for performing system trace suspension and collecting dump information will be described with reference to FIGS. 9 and 10. The performance data periodically collected by the micro program 2211 of the DKC 21 (performance data 2231 in the LM 223) is used as the condition for system trace suspension. The type of performance data being used are the following.

(p1) Response time of port connected to host 20

(p2) Response time of port used by remote copy IO (p3) Response time of LDEV (logical device)

(p4) MP operation rate (p5) PG (parity group) operation rate (p6) Cache write delay probability The response time of the port connected to the host 20 is the average time from when a target port 28 connected to the host 20 receives a command from the host 20 to when the target port 28 responds thereto. It can also be the amount of transfer per unit time of the target port 28.

The response time of the port used for remote copy IO is the average time from when a port connected to the remote copy target disk subsystem (initiator/external port 26 or RCU target port 27) receives a command from the host to when the port responds thereto. It can also be the amount of transfer per unit time of the initiator/external port 26 or the RCU target port 27).

The LDEV response time is the processing time from when a disk subsystem (DKC 21) receives a command to a certain LDEV (such as a user volume 25) from the host 20 to when the disk subsystem sends a response to the process.

The MP operation rate is a rate showing how much a microprocessor has been operating within a unit time.

The PG operation rate is a rate showing how much a parity group composed of a plurality of storage media (such as HDDs (Hard Disk Drives) has been operating within a unit time.

The cache write delay probability shows the rate of the amount of data saved in the cache memory area in the SM but not reflected on the storage media to the total storage capacity of the cache area 232, after the disk subsystem (DKC 21) has received the data to be written to the storage media from the host 20.

Other than the aforementioned hardware performance information, other indexes such as the rate of use of a journal volume being used during remote copy or the HDD operation rate can be used.

Next, we will describe the condition as the occasion of system trace suspension.

At first, when the performance threshold set for each of (p1) the response time of the port connected to the host 20, (p2) the response time of the port used for remote copy IO and the (p3) LDEV response time has been exceeded by (p1) or (p2) or (p3), the state is referred to as "condition A".

Next, the state where the hardware resources are not overload is referred to as "condition B". The hardware resources are the aforementioned (p4) MP operation rate, (p5) PG operation rate and (p6) cache write delay probability, and if all the loads of (p4), (p5) and (p6) (such as the operation rate or the write delay probability) do not exceed the performance thresholds set for each of (p4), (p5) and (p6), the state is referred to as "condition B". The occasion of system trace suspension is set when both condition A and condition B are satisfied.

In contrast, if the response time from (p1) to (p3) do not exceed the performance threshold, or if the hardware resource is experiencing overload as shown in FIG. 9, the state is not set as the occasion of system trace suspension. If excessive load status is confirmed in a normal hardware resource, that section becomes a bottleneck, leading to a problem of performance. Therefore, if the bottleneck section is clear, it is easy to specify the section considered to be experiencing failure, so that it is removed from the target of automatic collection of dump information. Thereby, it becomes possible to reduce unnecessary collection of dump information, shorten the time required for problem analysis, and the analysis efficiency can be improved.

The two graphs in FIG. 9 each show a port response time 91 with respect to an elapse time 92 and a hardware usage rate 93 with respect to the elapse time 92. The hardware usage rate 93 is the load of (p4) through (p6) mentioned earlier. At time point T1 of the elapse time 92, the port response time 91 has exceeded a performance threshold 911, so that as shown by reference number 912, exceeding of threshold occurs. Similarly, at time point T1 of the elapse time 92, the hardware usage rate 93 has exceeded a performance threshold 931, so that as shown by reference number 932, exceeding of threshold occurs. In this case, it is possible to immediately analyze that the response time of the port has been increased by the overload (high usage rate) of hardware resources as mentioned earlier. Therefore, the suspension of system trace and the collection of dump information are not performed.

On the other hand, in FIG. 10, at time point T1 of the elapse time 92, the port response time 91 has exceeded a threshold 911, so that as shown by reference number 912, exceeding of threshold occurs. However, the hardware resource usage rate 93 monitored by the micro program 2211 is not in an excessive load status within a monitored time 913 from time point T1 to time point T2, but in a steady state (below the performance threshold 931) (no exceeding of threshold 933). Therefore, it is possible that some kind of unexpected problem is occurring within the disk subsystem (DKC 21), so that the suspension of system trace and the collection of dump information are performed.

In a case where the port response time 91 instantly rises, the time during which the problem is apparent is short, and the overwrite of system trace information to the system trace information storage area 2233 (process result) is also quick. In order to prevent unnecessary collection of dump information, only the temporary rise of response time shown in FIG. 10 is set as the monitor target. That is, only when the time in which the port response time 91 has exceeded the performance threshold 911 falls within a range of monitor time 913 set in advance, it is set as the monitor target, and collection of dump information is performed. The monitor time 913 can be set to an arbitrary value, which can be set in advance by the micro program 2211 or can be set from the SVP 29. Further, the occasion of performing system trace suspension and collection of dump information can be determined based on the LDEV response time instead of the port response time.

<Operation of Collecting Dump Information>

Next, the sequence of operation from the system trace suspension to the collection of dump information and transfer thereof will be described with reference to FIGS. 11 to 14. The subject of the operation is set as the micro program 2211 operating in the MP of the MP unit 22, but the subject can also be other hardware resources such as the MP or other controllers.

Figure 11:
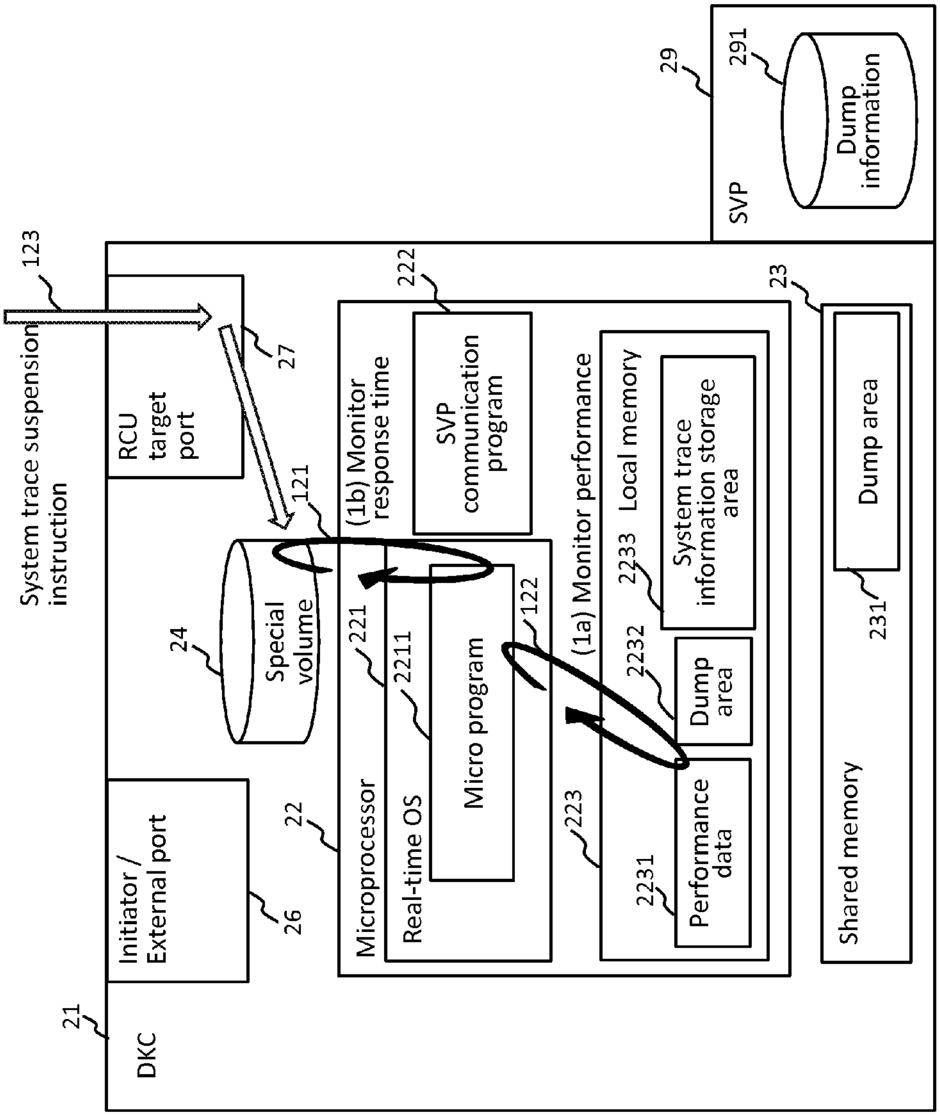
FIG. 11 is a view showing a monitor operation for detecting the occurrence of a problem.
Figure 12:
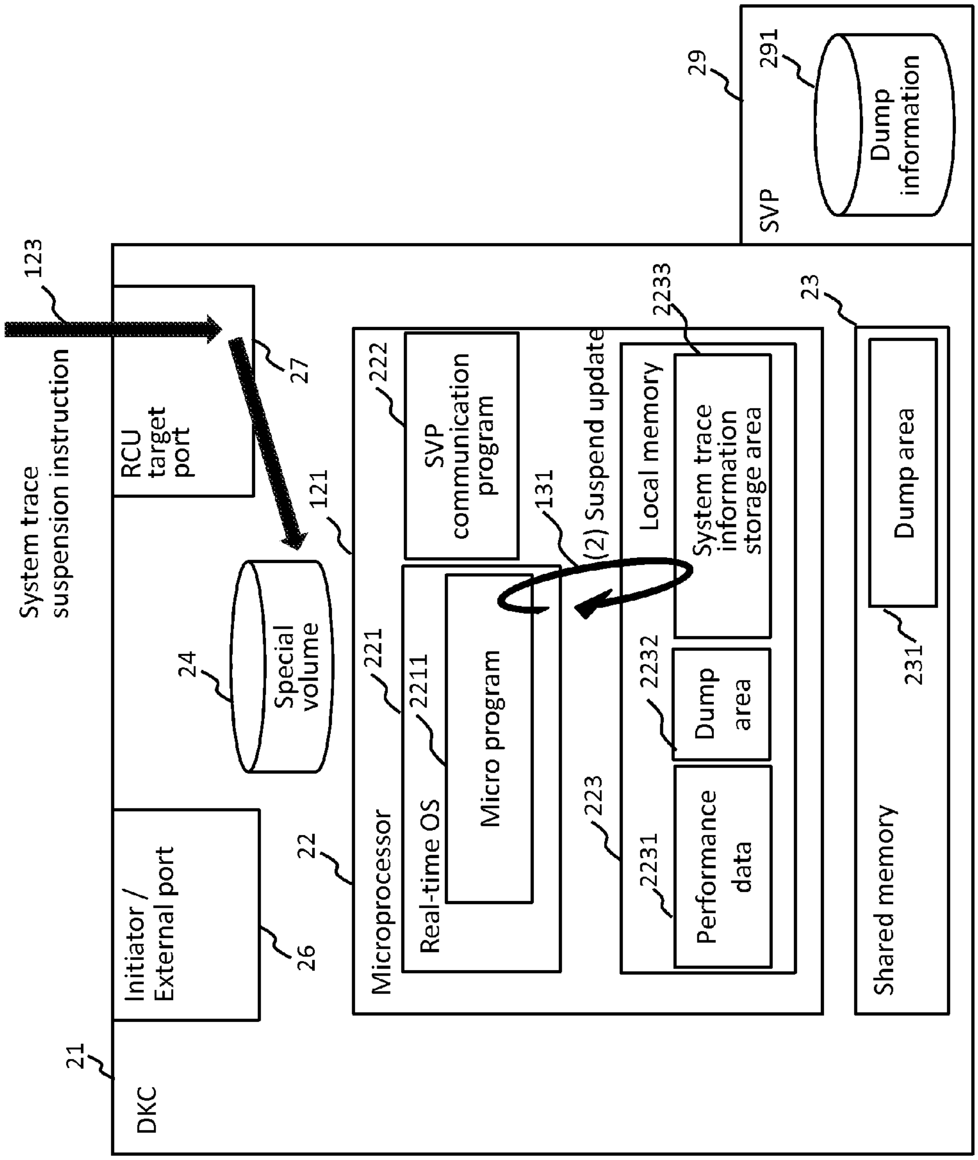
FIG. 12 is a view showing an operation to suspend update of data to the system trace information storage area.
Figure 13:
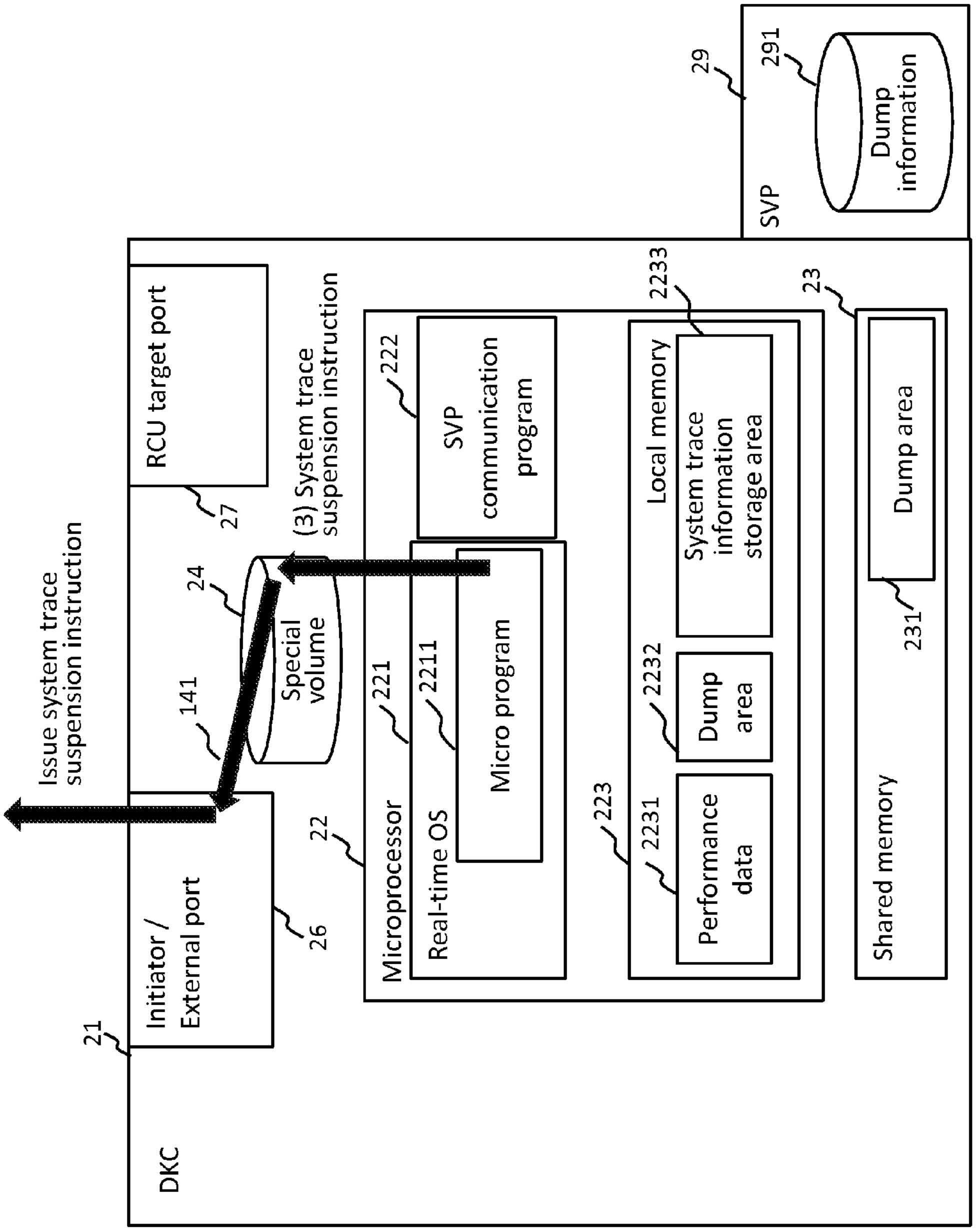
FIG. 13 is a view showing an operation for issuing a system trace suspension instruction.
Figure 14:
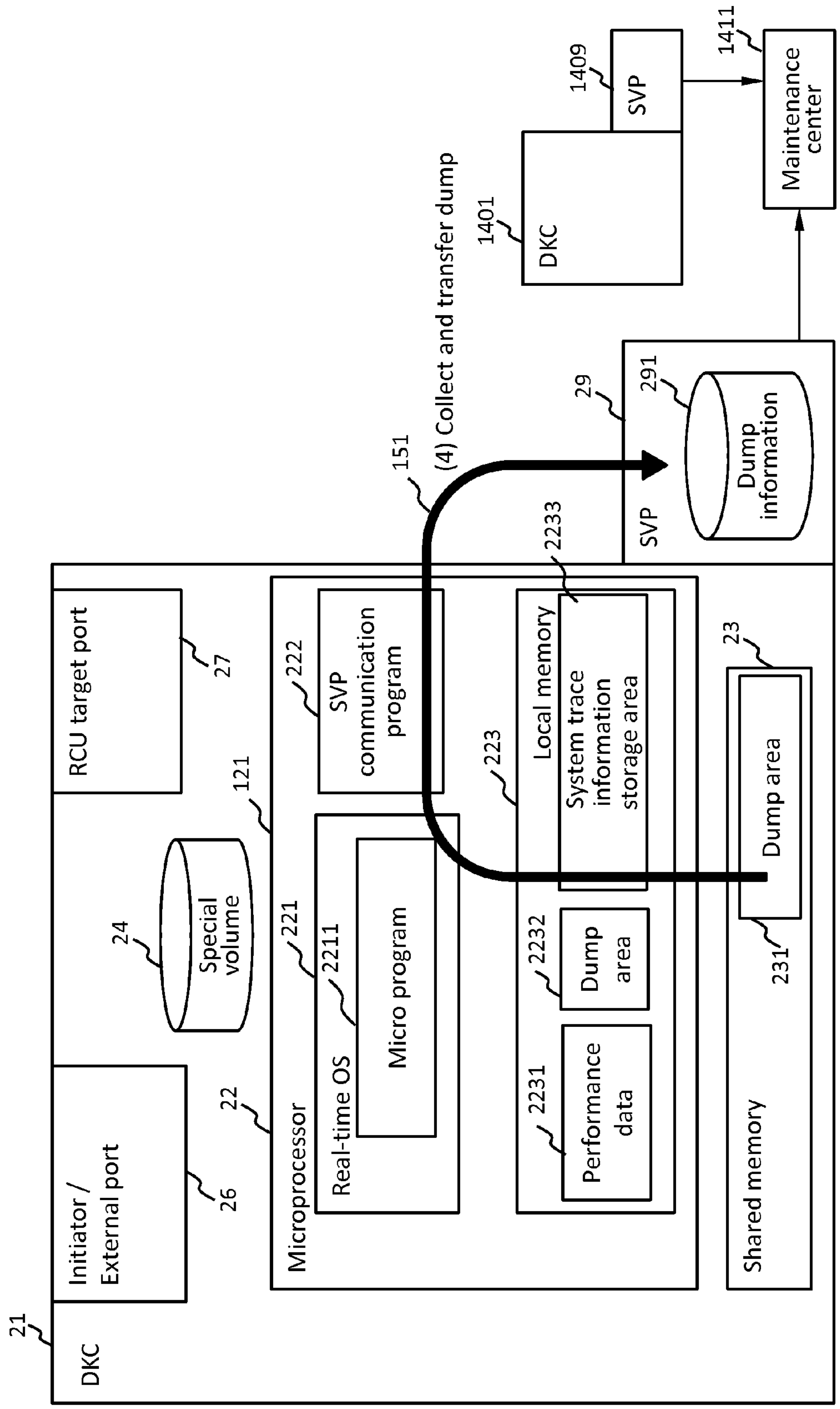
FIG. 14 is a view showing a transfer operation of dump information.

FIG. 11 is a view showing the monitoring operation for detecting the occurrence of a problem. FIG. 12 is a view showing the operation to suspend data update to the system trace information storage area. FIG. 13 is a view showing the operation for issuing an instruction to suspend system trace. FIG. 14 is a view showing the operation for transferring dump information.

<Operation 1>

At first, as shown in FIG. 11, the micro program 2211 monitors the following two operations and statuses set as the occasion of suspending system trace.

(1a) Instruction to suspend system trace from connected DKC (reference number 121)

(1b) Performance data in memory performing threshold management (reference number 122)

Incidentally, the system trace suspension instruction 123 from other DKC is issued for the special volume connected to the RCU target port 27. Further, in a state where two conditions and operations are monitored as described above, the micro program 2211 constantly updates the system trace information in the system trace information storage area 2233.

<Operation 2>

Next, as shown in FIG. 12, during monitoring of the interior of the DKC by the micro program 2211, when the condition matches either one of the following two conditions (2a) or (2b), the micro program 2211 stops update of the system trace information to the system trace information storage area 2233. The update of system trace information to the dump area 2232 of LM 223 and the dump area 231 of SM 23 is not suspended.

(2a) When the performance data of the monitor target corresponds to the threshold determination condition (2b) When a system trace suspension signal issued by other DKC is received The condition of (2a) is satisfied when the port response time of (p1) and (p2) or the LDEV response time of (p3) described earlier exceeds the set performance threshold, and all the MP operation rate of (p4), the PG operation rate of (p5) and the cache write delay probability of (p6) do not exceed the performance threshold. The actual determination process will be described in further detail with respect to FIG. 15.

<Operation 3>

Next, when the aforementioned condition of (2a) is satisfied and system trace is suspended, the micro program 2211 confirms whether a DKC or an external storage being the target of remote copy connected to the DKC 21 exists or not. If there is a DKC or an external storage being the target of remote copy connected to the DKC 21, the micro program 2211 issues a system trace suspension signal to the connection counterpart DKC via a remote copy connection path or an external storage connection path of a fiber channel protocol as shown in FIG. 13.

<Operation 4>

Next, as shown in FIG. 14, the micro program 2211 collects the system trace information (dump information) stored in the dump area 2232 and the system trace information storage area 2233 in the LM 223 and the dump information stored in the dump area 231 of SM 23, and transfers the collected dump information to the SVP 29. The SVP 29 saves the received dump information as dump information 291 in the internal volume. SVP 29 is a PC (Personal Computer) operating via an OS such as Windows (Registered Trademark), wherein the dump information is saved as a file having "XYZ.log" and the like as the file name. The dump information 291 includes an operation log showing the result of operation of the DKC 21 by the host 20.

Further it is also possible to perform analysis of the problem by sending the dump information 291 having been transmitted to the SVP 29 further to a maintenance center 1411. It is also possible to send the dump information having been transmitted to the SVP 1409 from other DKCs 1401 disposed at distant locations connected to the DKC 21 to the maintenance center 1411 to perform integral problem analysis using the two dump information and to send the solution remotely to the respective DKCs.

<Flow 1 of Process for Collecting Dump Information>

Figure 15:
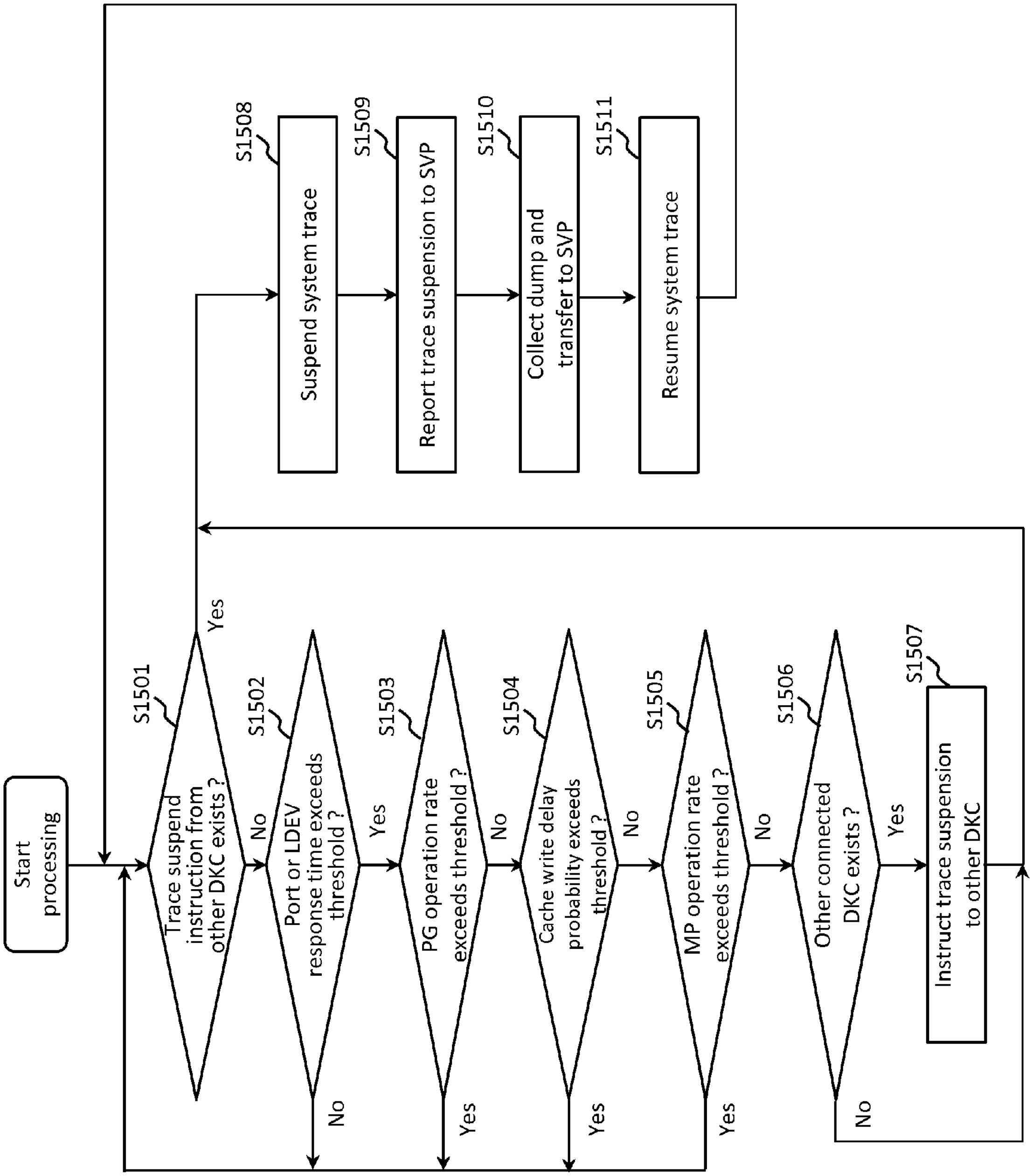
FIG. 15 is a view showing a process to collect dump information.

FIG. 15 is a view showing the process for collecting dump information. Next, the sequential process flow from the system trace suspension to the collection and transferring of dump information will be described with reference to FIG. 15. The subject of the operation is set as the micro program 2211 operating in an MP of the MP unit, but the subject can also be hardware resources such as the MP or other controllers.

At first, in step S1501, the micro program 2211 determines whether there is a system trace suspension instruction from other DKC (such as a secondary DKC 31 of FIG. 3). If there is such instruction, the micro program 2211 executes step S1508, and if not, executes step S1502.

Next, in step S1502, the micro program 2211 determines whether the port response time or the LDEV response time of DKC 21 has exceeded the performance threshold or not. If both has not exceeded the threshold, the micro program 2211 re-executes step S1501, and if exceeded, the program executes step S1503. The process of step S1502 corresponds to the determination of whether the aforementioned condition A is satisfied.

In step S1503, the micro program 2211 determines whether the PG operation rate has exceeded the performance threshold or not. If exceeded, the micro program 2211 re-executes step S1501, and if exceeded, the program executes step S1504.

In step S1504, the micro program 2211 determines whether the cache write delay probability has exceeded the performance threshold or not. If the threshold is exceeded, the micro program 2211 re-executes step S1501, and if not, the micro program executes step S1505.

In step S1505, the micro program 2211 determines whether the MP operation rate has exceeded the performance threshold or not. If the threshold is exceeded, the micro program 2211 re-executes step S1501, and if not, the micro program executes step S1506. The processes from step S1503 to step S1505 correspond to the determination of whether the aforementioned condition B is satisfied.

In step S1506, the micro program 2211 determines whether there exists other DKC connected to the DKC 21. If other DKC exists, the micro program 2211 executes step S1507, and if other DKC do not exist, the micro program executes step S1508.

In step S1507, the micro program 2211 issues a system trace suspension instruction to the other DKC. By this process, the suspension of system trace and the collection of dump information in the other DKC is enabled.

In step S1508, the micro program 2211 suspends system trace in DKC 21.

In step S1509, the micro program 2211 executes trace suspension report to the SVP 29.

In step S1510, the micro program 2211 collects dump information of DKC 21, and transfers the collected dump information to the SVP 29.

In step S1511, the micro program 2211 resumes system trace after completing transfer of collected dump information to the SVP 29. After resuming system trace, the micro program 2211 returns the process to step S1501.

Figure 16:
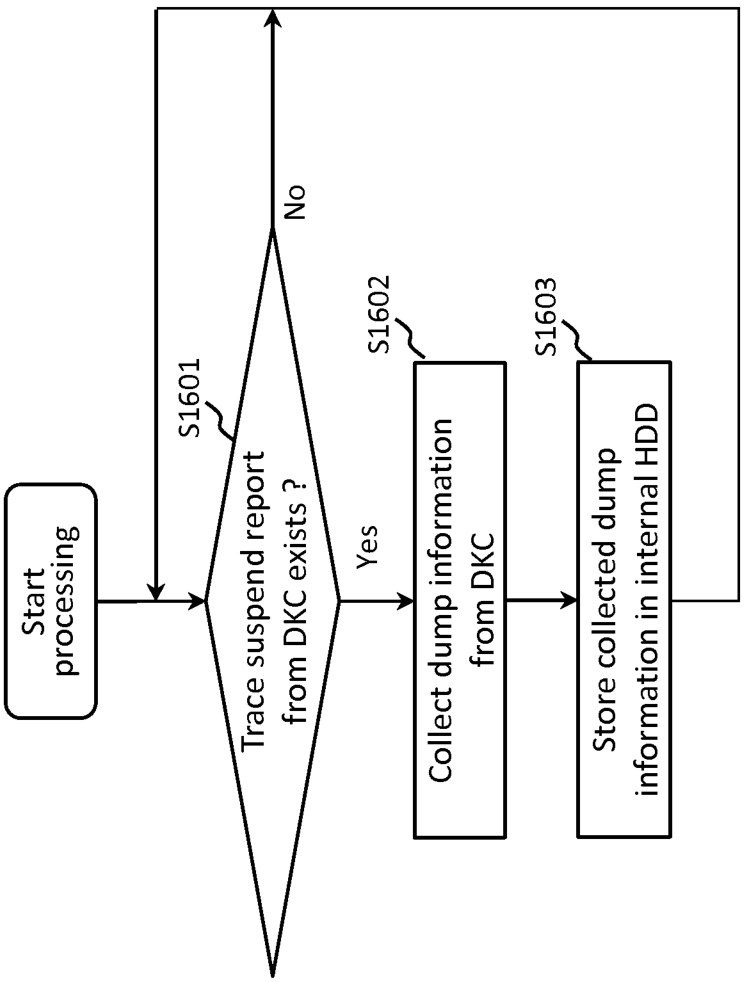
FIG. 16 is a view showing a process to transfer dump information to an SVP.

FIG. 16 is a view showing the transfer process of dump information to the SVP. Next, the process flow of SVP 29 is illustrated in FIG. 16. The subject of the process is the CPU (not shown) of the SVP 29.

In step S1601, the CPU determines whether there is a system trace suspension report from the DKC 21. If there is no report, the CPU re-executes the process of step S1601, and awaits a system trace suspension report. If there is a report, the CPU executes step S1602.

In step S1602, the CPU collects dump information from the DKC 21.

In step S1603, the CPU stores the collected dump information in the internal HDD. After storing information in the internal HDD, the CPU returns to the process to step S1601.

As described, the present invention enables to collect appropriate dump information necessary for analyzing problems. Further, the dump information at the time of occurrence of a problem can be collected appropriately and simultaneously from multiple DKCs. Therefore, the accuracy of problem analysis can be improved and the shortening of maintenance time can be realized.

<Embodiment 2>

<Occasion 2 of Collecting Dump Information>

Next, the method for collecting dump information based on the operation status of the disk subsystem will be described.

Figure 17:
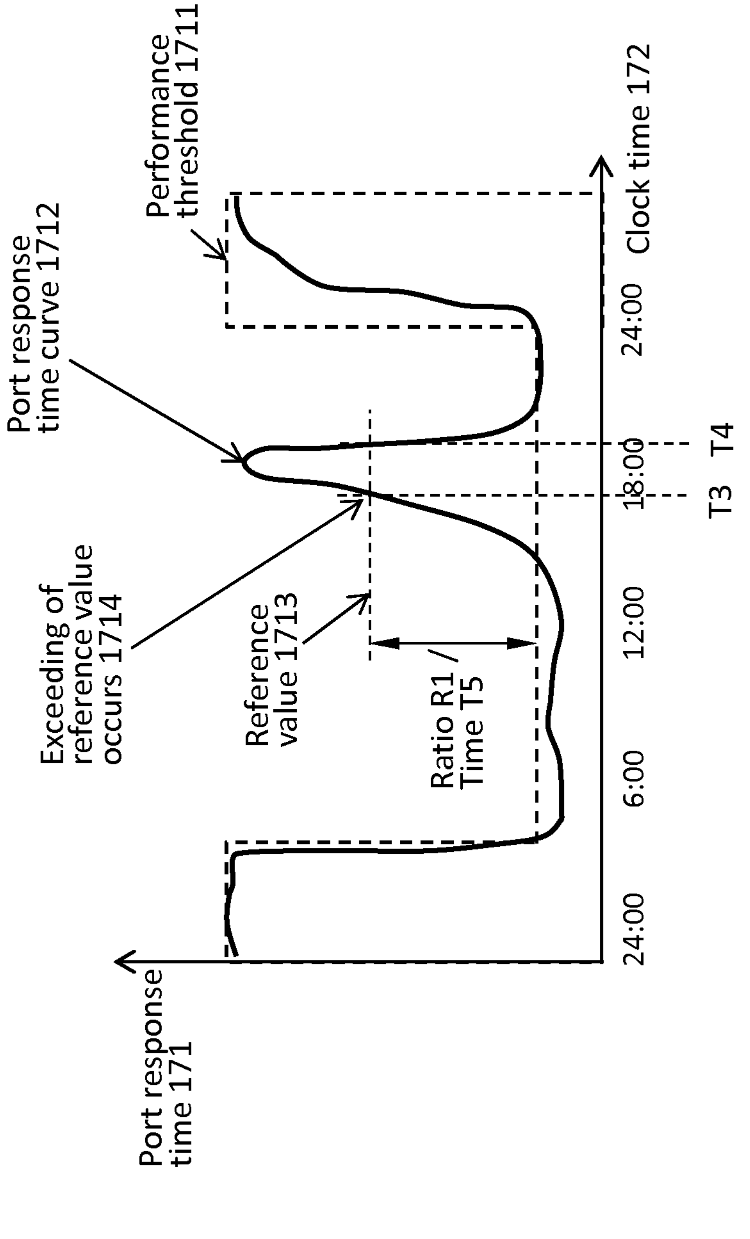
FIG. 17 is a view showing the detection of occurrence of a problem based on an operation status of the disk subsystem according to embodiment 2.

FIG. 17 is a view showing the detection of an occurrence of a problem based on the status of operation of a disk subsystem according to embodiment 2.

In embodiment 2, system trace is suspended and dump information is collected at an occasion when a deviation of an operation from an average operation rate of the disk subsystem has exceeded a set value. According to the work form of users, the amount of work regarding a sub disk system within a day may be cyclic. Therefore, it is highly possible that the input and output of the disk subsystem occurs in a certain pattern.

Therefore, the status of operation is monitored for a certain period of time, and a performance threshold of an average operation rate is created within the disk subsystem using an index of the average response time of a port throughout the day. Then, when the actual port response time has exceeded the set ratio or the set time, system trace is suspended and dump information is collected.

One condition of the occasion to collect dump information is the level of difference (ratio or time) of the average operation rate from the performance threshold, but the level can be set to an arbitrary value. Similarly, the time having exceeded the performance threshold can be set to an arbitrary value. Further, in order to collect dump information for more than necessary, only the temporary increase of port or LDEV response time is set as the monitor target, similar to the occasion 1 for collecting dump information mentioned earlier.

Actually, a performance threshold 1711 of average operation rate being the index of average response time throughout the day is set via a port response time 171 and clock time 172 of FIG. 17. It is also possible to set the performance threshold 1711 of average operation rate via an LDEV response time instead of the port response time. Then, based on the actual port response time, a port response time curve 1712 is created, which is compared with the performance threshold 1711.

The occasion to collect dump information is set when an excess ratio (R1) or an overtime (T5) of the port response time curve 1712 having exceeded the performance threshold 1711 has exceeded a reference value 1713 set in advance (occurrence of exceeding of reference value 1714, condition C), and when a continuous time of exceeding of reference value (from T3 to T4) is within a time threshold which is the range of time set in advance (condition D).

<Collect Process Flow 2 of Dump Information>

Figure 18:
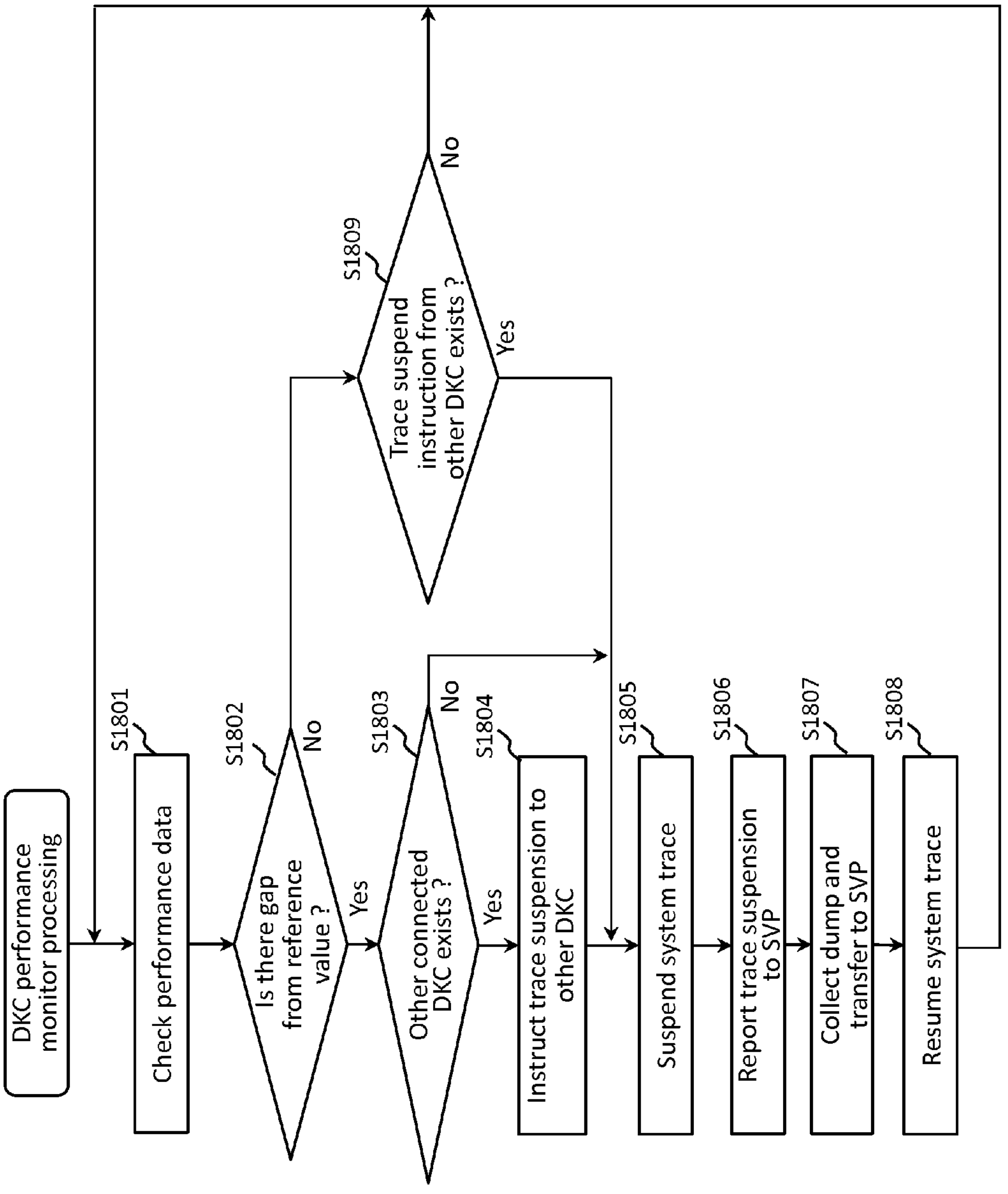
FIG. 18 is a view showing the process of collecting dump information.

FIG. 18 is a view showing a collection process of dump information. Next, the sequence of process flow from the suspension of system trace to the collection and transferring of dump information according to embodiment 2 will be illustrated with reference to FIG. 18. The subject of operation is set as the micro program 2211 operating in the MP of the MP unit 22, but the subject can be hardware resources such as the MP or other controllers.

In step S1801, the micro program 2211 checks the performance data 2231 in the LM 223.

In step S1802, the micro program 2211 compares the actual port response time curve 1712 to a performance threshold 1711, and determines whether there is a gap between the value and a reference value. In other words, the micro program determines whether the system condition satisfies condition C and condition D mentioned above. If both conditions are not satisfied (S1802: No), the micro program 2211 executes step S1809. If both conditions are satisfied (S1802: Yes), the micro program 2211 executes step S1803.

The processes from step S1803 to step S1808 are the same as the aforementioned processes from step S1506 to step S1511. Further, the process of step S1809 is the same as the process of step S1501.

As described, in embodiment 2 similar to embodiment 1, the port response time or the LDEV response time of a single day is measured to acquire the performance threshold 1711, and the occasion of dump collection is determined based on the level of gap from the actual port response time curve 1712, so that the dump information required for analyzing the problem can be collected appropriately. Further, the dump information at the time of occurrence of a problem can be collected appropriately and simultaneously from a plurality of DKCs. Thus, the accuracy of analyzing the problem can be improved and the maintenance time can be shortened.

The present invention is not restricted to the above-illustrated preferred embodiments, and can include various modifications. The above-illustrated embodiments are mere examples for describing the present invention in detail, and they are not intended to restrict the present invention to include all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations.

Furthermore, a portion or whole of the above-illustrated configurations, functions, processing units, processing means and so on can be realized via a hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk or an SSD (Solid State Drive), or in a memory media such as an IC card, an SD card or a DVD. Further, only the control lines and information lines considered necessary for description are illustrated in the drawings, and not necessarily all the control lines and information lines required for production are illustrated. In actual application, almost all the configurations are mutually coupled.

REFERENCE SIGNS LIST

1, 2 DKC
10 Micro program
11 System trace information storage area
20 Host
21 DKC
22 Microprocessor
23 Shared memory
24 Special volume
29 SVP
221 Real-time OS
222 SVP communication program
223 Local memory
231 Dump area
291 Dump information
2211 Micro program
2231 Performance data
2232 Dump area
2233 System trace information storage area

The invention claimed is:

1. A storage system including a plurality of disk subsystems, each disk subsystem comprising:

a processor configured to execute a control program for controlling the disk subsystem;

a first memory having a performance data area for storing performance data of a hardware resource of the disk subsystem and a first system trace information storage area for storing a first system trace information which is an execution result of the control program;

a second memory having a cache area for temporarily storing data from the host computer to the disk subsystem and a second system trace information storage area for storing a second system trace information other than the first system trace information;

a first port connecting to another disk subsystem that differs from said disk subsystem;

a second port connecting to the host computer; and a first volume constituting one or more parity groups from a plurality of storage media for storing data received from the host computer via the second port;

wherein when a performance data of the hardware resource exceeds a performance threshold determined in advance, each of the processors of the plurality of disk subsystems is configured to acquire respective first system trace information of each of the plurality of disk subsystems, and wherein the processor is further configured to suspend storing of the first system trace information to the first system trace information storage area, and to acquire the first system trace information stored in the first system trace information storage area.

2. The storage system according to claim 1, wherein the processor is configured to acquire the first system trace information by receiving a system trace suspension command from said another disk subsystem.

3. The storage system according to claim 1, wherein the disk subsystem comprises a second volume composed of a plurality of storage media for storing commands of said another disk subsystem, and the processor is further configured to:

transmit a system trace suspension command to said another disk subsystem via a second volume and the first port; and cause the storing of a respective first system trace information to a first system trace information storage area in said another disk subsystem to be suspended, and the respective first system trace information stored in the first system trace information storage area in said another disk subsystem to be acquired.

4. The storage system according to claim 1, wherein:

the performance data of the hardware resource includes one or more of following data:

(p1) a response time of the first port with respect to an input and output command from the host computer;

(p2) a response time of the second port with respect to an input and output command from the host computer;

(p3) a logical device response time which is a processing time to when an input and output command to the storage media is completed;

(p4) a process operation rate which is a rate of operation per unit time of the processor;

(p5) a parity group operation rate which is the ratio a rate of operation per unit time of the parity group;

(p6) a cache write delay probability which is a ratio of data quantity in the cache area being saved in the cache area but not reflected in the storage media to a total storage capacity;

(p7) an average response time of the first port per time within a day;

(p8) an average response time of the second port per time within a day; and (p9) an average response time of the logical device per time within a day.

5. The storage system according to claim 4, wherein a performance threshold with respect to the performance data is set in advance in the disk subsystem.

6. The storage system according to claim 5, wherein when any one of the performance data from (p1) to (p3) exceeds the performance threshold, an overtime falls within a range of time set in advance, and all the performance data of (p4) through (p6) is equal to or smaller than the performance threshold, the processor acquires the first system trace information.

7. The storage system according to claim 5, wherein when a level of gap of an actual response time from the performance threshold of (p7) to (p9) exceeds a value set in advance and an overtime is within a range of time set in advance, the processor acquires the first system trace information.

8. The storage system according to claim 1, wherein the storage system further comprises:

a maintenance terminal for monitoring an operation status of the disk subsystem; and the maintenance terminal comprises:

a controller;

an input device for entering information;

an output device for outputting information;

one or more storage devices for storing information; and a communication port for transmitting information to and receiving information from other external systems.

9. The storage system according to claim 8, wherein the processor is configured to transmit the acquired first system trace information to the maintenance terminal.

10. The storage system according to claim 9, wherein:

the maintenance terminal is connected via the communication port to an external system; and the controller of the maintenance terminal is configured to transmit the received first system trace information received by the maintenance terminal to the external system.

11. The storage system according to claim 8, wherein when a performance data of the hardware resource exceeds a performance threshold set in advance, each of the processors of the plurality of disk subsystems acquires a respective second system trace information within the plurality of disk subsystems, and transmits the same to the maintenance terminal.

12. The storage system according to claim 1, wherein the first port is a port performing communication via a fiber channel protocol.

13. A storage system including a plurality of disk subsystems, each disk subsystem comprising:

a processor configured to execute a control program for controlling the disk subsystem;

a first memory having a performance data area for storing performance data of a hardware resource of the disk subsystem and a first system trace information storage area for storing a first system trace information which is an execution result of the control program;

a second memory having a cache area for temporarily storing data from the host computer to the disk subsystem and a second system trace information storage area for storing a second system trace information other than the first system trace information;

a first port connecting to a second disk subsystem that differs from said disk subsystem;

a second port connecting to the host computer;

a first volume constituting one or more parity groups from a plurality of storage media for storing data received from the host computer via the second port;

a second volume composed of a plurality of storage media for storing commands from the second disk subsystem; and a maintenance terminal for monitoring a status of operation of the disk subsystem;

wherein the maintenance terminal comprises:

a controller for controlling the whole maintenance terminal;

an input device for entering information;

an output device for outputting information;

one or more storage devices for storing information; and a communication port for transmitting and receiving information with an external system;

wherein the performance data of the hardware resource includes one or more of following data:

(p1) a response time of the first port with respect to an input and output command from the host computer;

(p2) a response time of the second port with respect to an input and output command from the host computer;

(p3) a logical device response time which is a processing time to when an input and output command to the storage media is completed;

(p4) a process operation rate which is a rate of operation per unit time of the processor;

(p5) a parity group operation rate which is the ratio a rate of operation per unit time of the parity group;

(p6) a cache write delay probability which is a ratio of data quantity in the cache area being saved in the cache area but not reflected in the storage media to a total storage capacity;

(p7) an average response time of the first port per time within a day;

(p8) an average response time of the second port per time within a day; and (p9) an average response time of the logical device per time within a day;

wherein a performance threshold is set for each performance data from (p1) to (p9);

wherein when any one of the performance data from (p1) to (p3) exceeds the performance threshold, an overtime falls within a range of time set in advance, and all the performance data of (p4) through (p6) is equal to or smaller than the performance threshold, or when a level of gap of an actual response time from the performance threshold of (p7) to (p9) exceeds a value set in advance and the overtime is within a range of time set in advance, the processor:

issues a system trace suspension command to a connected disk subsystem;

suspends storage of the first system trace information to the first system trace information storage area;

performs a first transmission by transmits transmitting a system trace suspension report to the maintenance terminal;

performs a second transmission by transmits transmitting the first system trace information and the second system trace information to the maintenance terminal;

resumes storing of the first system trace information to the first system trace information storage area after completing the first and second transmissions transmission; and a controller of the maintenance terminal:

stores the received first system trace information and the second system trace information received by the maintenance terminal to a storage device, transfers the first system trace information and the second system trace information to an external system via the communication port; and the input device receives input of the performance threshold and a time range, and the output device outputs the performance threshold, the time range and the performance data.

* * * * *